(12) United States Patent
Farmer

(10) Patent No.: US 8,586,227 B2
(45) Date of Patent: Nov. 19, 2013

(54) LOW TEMPERATURE SODIUM-BETA BATTERY

(75) Inventor: Joseph C. Farmer, Tracy, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 352 days.

(21) Appl. No.: 13/042,732

(22) Filed: Mar. 8, 2011

(65) Prior Publication Data

US 2011/0223460 A1    Sep. 15, 2011

Related U.S. Application Data

(60) Provisional application No. 61/312,375, filed on Mar. 10, 2010.

(51) Int. Cl.
*H01M 4/36* (2006.01)
*H01M 10/04* (2006.01)
*H01M 10/28* (2006.01)
*H01M 10/36* (2010.01)

(52) U.S. Cl.
USPC .................. 429/104; 429/231.9; 29/623.1

(58) Field of Classification Search
USPC ............ 429/104, 11, 145, 112, 167, 218.1, 429/231.9; 29/623.1
See application file for complete search history.

(56) References Cited

U.S. PATENT DOCUMENTS

| | | | | |
|---|---|---|---|---|
| 3,773,558 A | * | 11/1973 | Charbonnier et al. | 429/337 |
| 3,935,025 A | * | 1/1976 | Cadman et al. | 429/101 |
| 4,018,969 A | * | 4/1977 | Fischer et al. | 429/104 |
| 4,874,483 A | * | 10/1989 | Wakabayashi et al. | 205/506 |
| 4,975,344 A | | 12/1990 | Wedlake et al. | |
| 5,264,298 A | * | 11/1993 | Townsend | 429/419 |
| 2007/0099080 A1 | * | 5/2007 | Pickett et al. | 429/188 |
| 2010/0279174 A1 | | 11/2010 | Young | |

FOREIGN PATENT DOCUMENTS

EP    1363343 A1 * 11/2003    ............ H01M 10/39

* cited by examiner

*Primary Examiner* — Kenneth Douyette
(74) *Attorney, Agent, or Firm* — Eddie E. Scott

(57) ABSTRACT

A battery that will operate at ambient temperature or lower includes an enclosure, a current collector within the enclosure, an anode that will operate at ambient temperature or lower within the enclosure, a cathode that will operate at ambient temperature or lower within the enclosure, and a separator and electrolyte within the enclosure between the anode and the cathode. The anode is a sodium eutectic anode that will operate at ambient temperature or lower and is made of a material that is in a liquid state at ambient temperature or lower. The cathode is a low melting ion liquid cathode that will operate at ambient temperature or lower and is made of a material that is in a liquid state at ambient temperature or lower.

24 Claims, 6 Drawing Sheets

LOW TEMPERATURE SODIUM-BETA BATTERY

CROSS-REFERENCE TO RELATED APPLICATIONS

The present application claims benefit under 35 U.S.C. §119(e) of U.S. Provisional Patent Application No. 61/312,375 filed Mar. 10, 2010 entitled "Novel High-Performance Rechargeable Batteries with Fast Solid-State Ion Conductors—Improvements on the Low Temperature Sodium-Beta Battery," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to batteries and more particularly to a low temperature sodium-beta battery.

2. State of Technology

Prior art high-temperature sodium-beta (Na-(3) batteries have achieved energy densities comparable to the best Li-ion batteries, with specific power comparable to that of the majority of commercially available cells. A reversible liquid-phase anode, coupled with a solid-state Na-ion conductive electrolyte, has enabled the Na-sulfur battery to achieve a cycle life of 2,250 cycles at 100% depth-of-discharge and 4,500 cycles at 80% depth-of-discharge, and the Na-metal chloride battery to achieve even higher cycle life. The high-temperature sodium-beta (Na-(3) batteries have been used in electric vehicles (EVs) and could potentially be used in deep-sea rescue vehicles. The primary challenge for these batteries is the need for high-temperature operation necessary to-keep the anode-above the melting-point of sodium. Approximately 10% of the batteries' energy is used to keep the battery heated to the relatively high core temperature, and the specific energy and energy density are further compromised by the need for thermal insulation.

Referring now to the drawings and in particular to FIG. 1, an example of a prior art high-temperature sodium-beta (Na-(3) battery is illustrated. The battery is a high temperature liquid anode and cathode battery designated generally by the reference numeral 100. The battery includes the following components: current collector 10 which can be made of stainless steel 304 or 316, electrical insulation 12, outer casing 14, heat insulation 16, inner casing, cathode 20, separator/electrolyte 22, and anode 24. The battery 100 is usually made in a tall cylindrical configuration. The battery 100 is enclosed by a steel casing 14 that is protected from corrosion on the inside.

U.S. Pat. No. 4,975,344 issued to Roger J. Wedlake and Johan Coetzer Dec. 4, 1990 provides the state of technology information reproduce below:

This invention relates to electrochemical power storage cells. More particularly, the invention relates to an electrochemical power storage cell which is rechargeable and which has a molten alkali metal anode [negative electrode] separated by a separator from a cathode which comprises an electronically conductive electrolyte-permeable porous matrix which is impregnated with a liquid electrolyte and which has electrochemically active cathode [positive electrode] material dispersed therein.

The Applicant is aware of cells of the type described above, in which the separator is tubular in shape, having the cathode inside the tube and the anode outside the tube, or vice versa. When the cathode is outside the separator it is generally also tubular in shape, and when it is inside the separator it may be tubular or cylindrical. Typically, in such cells, the maximum capacity is determined by the size of the sealed hollow interior of the separator tube, which defines the maximum size of the electrode [cathode or anode as the case may be] located in its interior. For efficiency as regards volumetric energy density, which is related to the parameter [Ah/m$^3$], and indeed mass energy density, which is related to the parameter [Ah/kg], the interior space of the separator must be completely filled by the electrode occupying it, so that such cells are typically designed to have the separator tube completely filled by one of the electrodes, the other electrode, outside the separator tube, being designed to have a matching capacity. The cell thus has, for a particular cathode material and anode material, a single value for its capacity, and hence a single value for the parameter capacity/unit area separator surface, at which there is maximum volumetric energy density and maximum mass energy density.

Such cells, designed to have their separator tubes completely filled by one of the electrodes, thus suffer from substantial inflexibility as regards varying, for a fixed diameter of separator tube, the value of capacity/unit area of separator surface. This value cannot be increased, as the electrode in the separator tube cannot be enlarged, and the value of capacity/unit area of the separator surface can only be reduced inefficiently. While it is straightforward efficiently to reduce the capacity of the electrode outside the separator tube by reducing its radial thickness or volume, a corresponding reduction in capacity of the electrode inside the separator tube causes problems. Either the separator tube will be incompletely filled, leading to a volumetric energy density penalty, or it will contain electrode material which cannot be discharged and is dead weight, leading to both mass energy density and volumetric energy density penalties.

It follows thus that to alter the value of the parameter capacity/unit area of separator surface, while keeping the separator interior completely filled with an electrode which can be fully discharged so as to maintain optimum mass- and volumetric energy density, it is necessary to alter the diameter of the separator tube. However, substantial expense is involved in tooling up to make tubes of the type in question, involving the use e.g. of stainless steel precision-made mandrels and matching membranes for isostatic pressing of tubes on to the mandrels. The expense of altering tube diameter is often prohibitive and severely restricts design flexibility with regard to varying the value of the parameter capacity/unit area of separator surface, while maintaining efficient mass- and volumetric energy density. Such variation is however desirable for various different cell applications.

United States Published Patent Application No. 2010/0279174 by Edgar D. Young published Nov. 4, 2010 provides the state of technology information reproduce below:

Another metal that has been investigated for use in batteries as an alternative to lithium is sodium. Sodium is attractive for such use because of its high reduction potential, its low weight, its non-toxic nature, its relative abundance and ready availability, and its low cost. In order to construct practical batteries, the sodium must be used in liquid, or molten, form and must be kept isolated from moisture, including humidity in ambient air.

An example of a commercially viable sodium battery was developed in 1985 by the Council for Scientific and Industrial Research in Pretoria, South Africa. The battery, which was invented by the Council's Zeolite Battery Research Africa Project (nicknamed "ZEBRA"), is described, among other places, in U.S. Pat. No. 4,975,344, the entire disclosure of which is hereby incorporated by reference. The ZEBRA battery includes an anode of molten sodium, an electrolyte of molten sodium chloroaluminate ($NaAlCl_4$), a cathode of nickel or another transition metal in the discharged state (a metal chloride when charged), and a ceramic separator of sodium ion-conducting beta-alumina to prevent contact between the molten sodium anode and the $NaAlCl_4$ electrolyte. The technical name for the battery is sodium-nickel chloride ($Na$—$NiCl_2$) battery, but it is commonly referred to as the "ZEBRA battery."

The ZEBRA battery's liquid electrolyte solidifies below its melting point of 157° C. (314.6° F.), and the normal operating temperature range is typically between 250° C. (482° F.) and 350° C. (662° F.). The β-alumina solid electrolyte (BASE) that is employed as a membrane, or separator, within this system is very stable, both to the sodium metal anode and the sodium chloroaluminate electrolyte. The primary elements used in the manufacture of ZEBRA batteries—that is, sodium, chloride, and aluminum—have much higher worldwide reserves and annual production than the lithium used in lithium-ion batteries discussed above.

One potential shortcoming of the ZEBRA battery, which may prevent its widespread adoption, is the reliance upon nickel as the cathode material. The estimated world reserves of nickel are on the order of about eight hundred million tons, closer to those of lithium (twenty-eight million tons) than magnesium (eight billion tons). Worldwide adoption of the ZEBRA battery as the primary type of automotive battery would quickly deplete the available global reserves, thereby reinforcing the need for a battery that utilizes more abundant materials.

Accordingly, a need exists in the industry for a durable battery made of readily abundant materials, which may be easily assembled and repeatedly recharged.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention relates to batteries and more particularly to a Low temperature sodium-beta battery, which is capable of operating at room-temperature instead of the 300 to 400 degrees Centigrade where conventional sodium-beta batteries operate. The battery of the present invention will operate at ambient temperature or lower. The battery includes an enclosure, a current collector within the enclosure, an anode that will operate at ambient temperature or lower within the enclosure, a cathode that will operate at ambient temperature or lower within the enclosure, and a separator and electrolyte within the enclosure between the anode and the cathode. The term "Ambient Temperature" as used in this application means a temperature of less than 30° C. The The anode is a sodium alloy with a low-melting eutectic composition that will operate as a dimensionally stable liquid-phase electrode at or below room temperature. In one scenario, the cathode is a sulfur alloy with a low-melting eutecting composition that will also operate as a dimensionally stable liquid-phase electrode at or below room temperature. In another scenario the cathode compartment contains a low melting ionic liquid in contact with the active cathode material, that is also capable of operating at or below room temperature.

The battery of the present invention will operate at ambient temperature or lower. The battery includes an enclosure, a current collector within the enclosure, an anode that will operate at ambient temperature or lower within the enclosure, a cathode that will operate at ambient temperature or lower within the enclosure, and a separator and electrolyte within the enclosure between the anode and the cathode. The anode is a sodium eutectic anode that will operate at ambient temperature or lower and is made of a material that is in a liquid state at ambient temperature or lower. The cathode is a low melting ion liquid cathode that will operate at ambient temperature or lower and is made of a material that is in a liquid state at ambient temperature or lower.

The present invention provides a high-performance rechargeable Na-β battery, with twice the specific energy of the best Li-ion system. Such a battery will provide many of the advantages of the conventional high-temperature sodium-beta battery, but at an operating temperature of less than 30° C. instead of the 290-390° C. the conventional Na—S battery requires, thereby reducing the need for auxiliary heating and insulation against the weather. The present invention utilizes a low-melting Na alloy as the anode that cycles between Na-rich and Na-lean alloy compositions. The melting point of the Na-based alloy anode is less than 30° C., below the melting point of pure Na (98° C.). This alloy has been designed so that the other alloying elements are electrochemically stable at potentials where Na is oxidized and reduced. Similarly, other low-melting alloy systems have been developed for fabrication of the cathode, and will operate below 30° C. The battery of the present invention can have a specific energy greater than 400 Wh/kg (0.400 Wh/kg), twice that of the best Li-ion batteries now under development for EV applications, and can have an expected life of 4,500 charge-discharge cycles, with the formation of no gaseous products in the event of overcharge (a disadvantage of the current generation of Na-a cells).

The battery of the present invention can have low-temperature operation that uses new light-weight packaging and current collection, and thinner solid-state ($β''$-$Al_2O_3$) electrolyte-separators, capable of conduction $Na^+$ ions, enable this variant to achieve a specific energy of 400 Wh/kg (0.400 Wh/kg). The battery of the present invention can have the same long cycle life enjoyed by high-temperature ZEBRA batteries, three-times longer than that of the best Li-ion batteries, and two orders-of-magnitude longer than that now possible with the most promising Li-air technology. The battery of the present invention can further enhance the room-temperature Na-β battery by using light-weight silica aerogel with the lowest thermal conductivity of known engineering material for thermal insulation, thereby minimizing heat loss in cold weather, and ultra-high surface area current collectors for enhance rate capability.

The battery of the present invention will reduce operating temperature of Na-β batteries to room temperature (30° C.), while maintaining the performance of the high-temperature batteries, with a standby mode capable of maintaining the anode in the liquid state much lower temperatures (−15° C.). The battery of the present invention is a realistic, high-performance, rechargeable device with an specific energy and energy density that is twice that of the best Li-ion batteries now under development for EV applications. Ultimately, the battery of the present invention will achieve specific energy density greater than 400 Wh/kg (404 to 406 Wh/kg) and a volumetric energy density greater than 600 Wh/L (852 to 961 Wh/L). Based upon high-temperature Na-β cell and system data, the battery of the present invention will have a specific energy and energy density for a battery-pack (system) of approximately 65% of that of an individual cell. Assuming similar scaling for the low-temperature analogs, the corresponding specific energy and energy density for a system are 263-264 Wh/kg and 554-625 Wh/L, respectively. If it is assumed that the room-temperature (RT) Na-β has a cost comparable to the high-temperature Na-β system, the cost should be $150 to 250 per kilowatt-hour.

One safety feature of the battery of the present invention is the fact that the battery will not produce gaseous products in the event of overcharge, which is a disadvantage of the current generation of high-temperature Na-a cells. In addition, operation at lower temperatures reduces the need for auxiliary heating and insulation against the weather, which eliminates 10-20% of electrical losses per day needed to keep the system warm.

Uses of the battery of the present invention includes automotive batteries, EV, HEV, PHEV, buses, delivery vans, transport trucks, locomotives, uninterruptable power supplies (UPS) for server farms, load leveling and grid storage, marine and aerospace applications. Uses of the battery of the present invention also includes energy storage for battle field applications, including military bases, silent watch, propulsion for ships, directed energy weapons and other applications. Specific uses of the battery of the present invention includes energy storage for electric vehicles (EVs) as well as electrical grid storage and deep-sea rescue vehicles.

The battery of the present invention has exceptional specific energy (ultimately, several times greater than that of conventional Li-ion batteries), is intrinsically safe, exhibits long cycle life due to exceptional reversibility and dimensional stability, and in the specific case of the ZEBRA-RT battery of the present invention, can operate at room temperature (in sharp contrast to the conventional ZEBRA).

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1:
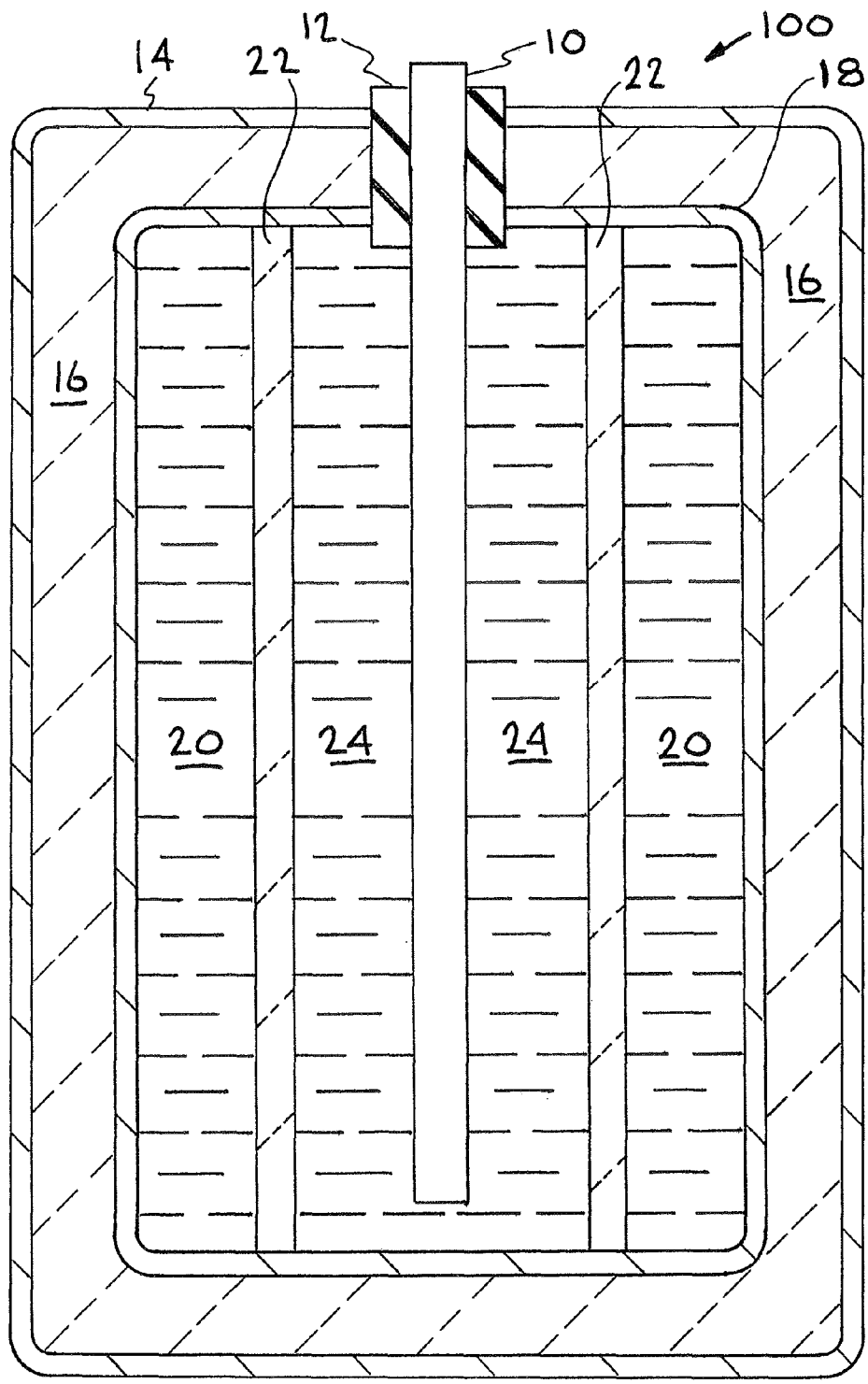
FIG. 1 is an illustration of a prior art high-temperature sodium-beta (Na-β) battery.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Figure 2:
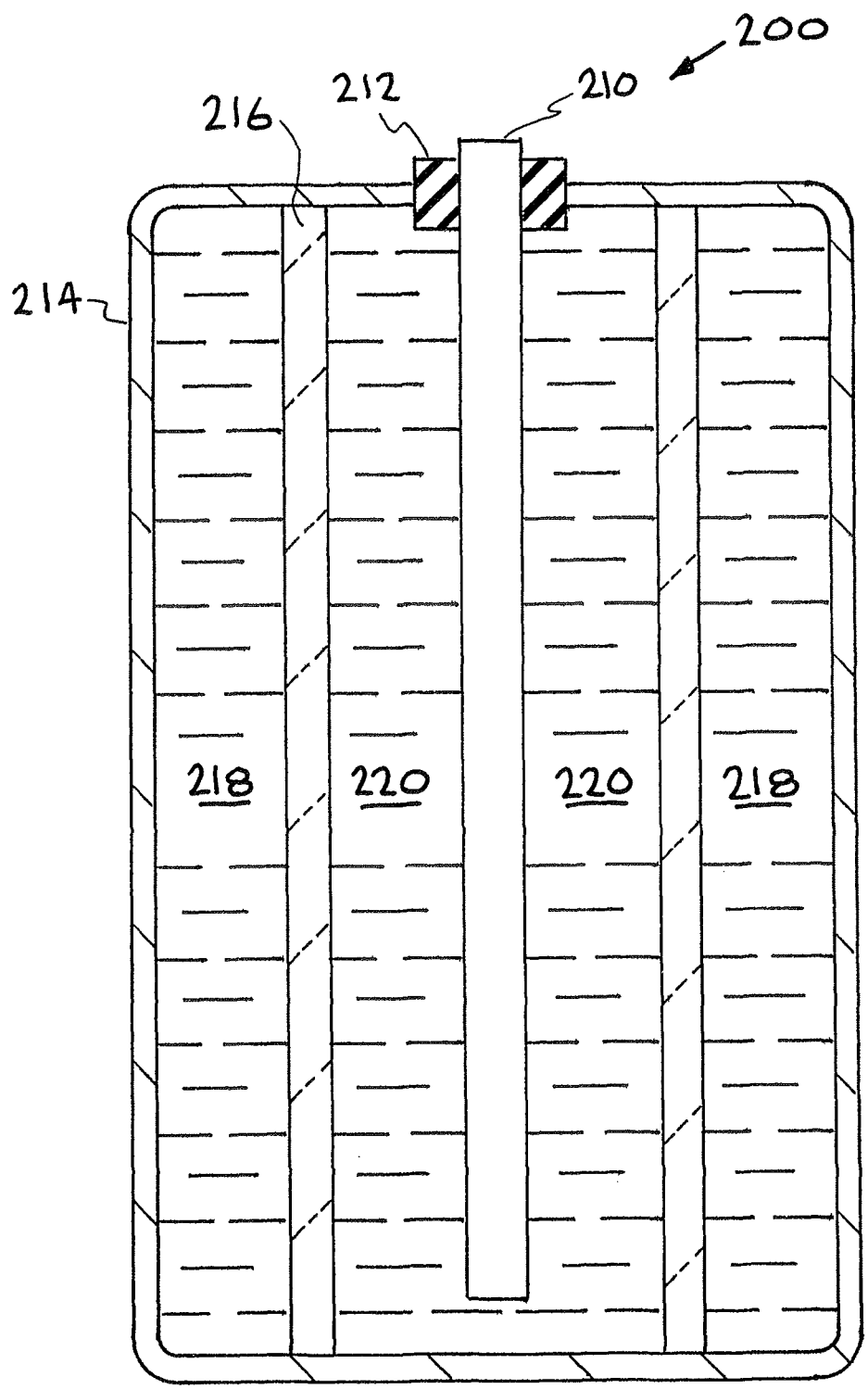
FIG. 2 illustrates one embodiment of a battery of the present invention.

Referring now to FIG. 2, an example of one embodiment of a low temperature sodium-beta battery of the present invention is illustrated. The low temperature sodium-beta battery is designated generally by the reference numeral 200. The battery 200 is a low temperature eutectic alloy anode and cathode battery. The battery 200 is constructed in a cylindrical configuration. The battery 200 includes the following components: current collector 210, electrical insulation 212, casing 214, separator/electrolyte 216, cathode 218, and anode 220. The anode 220 is located in the inner annulus around the current collector 210. The cathode 218 is located in the annulus outside of the separator/electrolyte 216.

The current collector 210 can be made of stainless steel 304 or 316. The separator/electrolyte 216 is a sodium-conducting separator, for example a β"-Al$_2$O sodium-conducting separator. The cathode 218 is a low melting ion liquid cathode. For example, the cathode 218 is a low melting ion liquid cathode and can be made of $FeCl_2$ or $NiCl_2$ or mixture of $FeCl_2$ and $NiCl_2$. The anode 220 is a sodium eutectic anode that is in a liquid state at ambient (or lower) temperature. Additions of other alkali metals to the Na anode 220 will suppress the melting point over a wide range of composition. For example, the melting points for Na, K, Rb and Cs are 97.82° C., 63.70° C., 38.89° C. and 28.39° C., respectively with the melting points decreasing with increasing atomic size.

In the construction of the battery 200 a low-melting Na alloy is used as the anode 220 that cycles between Na-rich and Na-lean alloy compositions. The melting point of the proposed Na-based alloy anode 220 is less than 30° C., below the melting point of pure Na (98° C.). The alloy for anode 220 has been designed so that the other alloying elements are electrochemically stable at potentials where Na is oxidized and reduced. Similarly, other low-melting alloy systems have been developed for fabrication of the cathode 218, and will operate below 30° C. The Applicant has realized and documented that the main challenge for building this type of battery in the past was the lack of material technology available for reducing the melting point of the electrodes, and thus the overall operating temperature. The Applicant has identified the key components and materials needed to develop a low-temperature Na-β battery; and performance data has shown each piece of the overall system works as intended when separate, and that when integrated together produces the desired result. The low melting binary sodium alloy for anode 220 has very high electrical conductivity and can be used with minimal current collector metal, thereby lowering the battery 200 in weight. In addition, by using liquid electrodes, the battery 200 will be able to maintain dimensional stability over thousands of charge-discharge cycles, thereby achieving unparalleled system life and life cycle cost.

The anode 220 and cathode 218 electrodes are capable of remaining in the liquid state at much lower temperature, perhaps as low as −30° C. Such an achievement eliminates the need for thermal insulation and avoids the energy losses associated with heat leakage. Specific energies of 600 to 1200 Wh/kg may be achievable, with relatively good reliability and safety. Table I shows examples of materials that can be used for the anode. Table II shows examples of materials that can be used for the cathode.

TABLE 1

Examples of materials that can be used for the anode.

| Eutectic | Compositional Range Below Room Temperature | Melting Point |
|---|---|---|
| 20Na—80Cs | | −31.83° C. |
| 31Na—69K | 15Na—85K to 60Na—40K | −12.62° C. |
| 18Na—82Rb | | −4° C. |

Low-temperature cathodes for the two types of sodium-beta cells are as follow:
  a. Room-Temperature Analogs of NaS Cathodes
    i. High-Temperature: S Baseline
    ii. Room-temperature (30° C.): Liquid S—Br and S—I Binary
    iii. Room-temperature (30° C.): Composite S Cathodes
  b. Room-Temperature Analogs of ZEBRA Cathodes
    i. (Ni,Fe)Cl$_2$ Molten-Salt Baseline (300-350° C.)
    ii. FeCl$_2$+NaAlCl$_4$+Quad-A IL (30° C.)
    iii. FeCl$_2$+NaAlCl$_4$+THF (30° C.)

TABLE 2

Examples of materials that can be used for the cathode.

| Cathode | Operating Temperature | Comment |
|---|---|---|
| Molten Sulfur | 290-390° C. | Conventional High Temp. NaS |
| Molten S—Br Binary | <30° C. | Room Temperature NaS |
| Molten S—I Binary | <30° C. | Room Temperature NaS |
| (Ni, Fe)Cl$_2$ Molten Salt | 300-350° C. | Conventional High Temp. ZEBRA |
| FeCl$_2$ + NaAlCl$_4$ + Quad-A Ionic Liquid | <30° C. | Room Temperature ZEBRA |
| FeCl$_2$ + NaAlCl$_4$ + THF | <30° C. | Room Temperature ZEBRA |

Several sodium-beta cells are utilize, with a sodium-conducting (β"-Al$_2$O$_3$ separator 216, and with electrodes 218 and 220 that exist in the liquid state at ambient (or lower) temperature, without the energy losses and penalties in weight and volume associated with high temperature operation. Additions of other alkali metals to the Na anode will suppress the melting point over a wide range of composition. For example, the melting points for Na, K, Rb and Cs are 97.82° C., 63.70° C., 38.89° C. and 28.39° C., respectively with the melting points decreasing with increasing atomic size. In contrast, the melting point of the 31Na-69K eutectic composition is −12.62° C. [Okamoto 2000], while the melting points of the 18Na-82Rb and 20Na-80Cs eutectic compositions are −4° C. and −31.83° C., respectively. The phase diagram for the Na—K binary alloy published by ASM (FIG. 1) indicates that the eutectic (33Na-67K) has a slightly different melting point (−15° C.) [Webster 1987].

Examination of the Na—K system reveals that this system remains in the molten state at temperatures at or below 30° C. from 15Na-85K to 60Na-40K (differential of 45 atomic percent Na, active material). The effective specific capacity associate with this differential composition is approximately 530 Ah/kg, compared to 1,170 Ah/kg from pure Na. Willingness to operate at 40° C. extends this range from 10Na-90K to 70Na-30K (differential of 60 atomic percent Na, active material). It will be possible to maintain this electrode in the molten state at temperatures as low as −15° C. (melting point of the eutectic) by using the battery management system (BMS) to bring the electrode to the eutectic composition while standby mode, which occurs at a state-of-charge (SOC) of approximately 36 percent.

Figure 3:
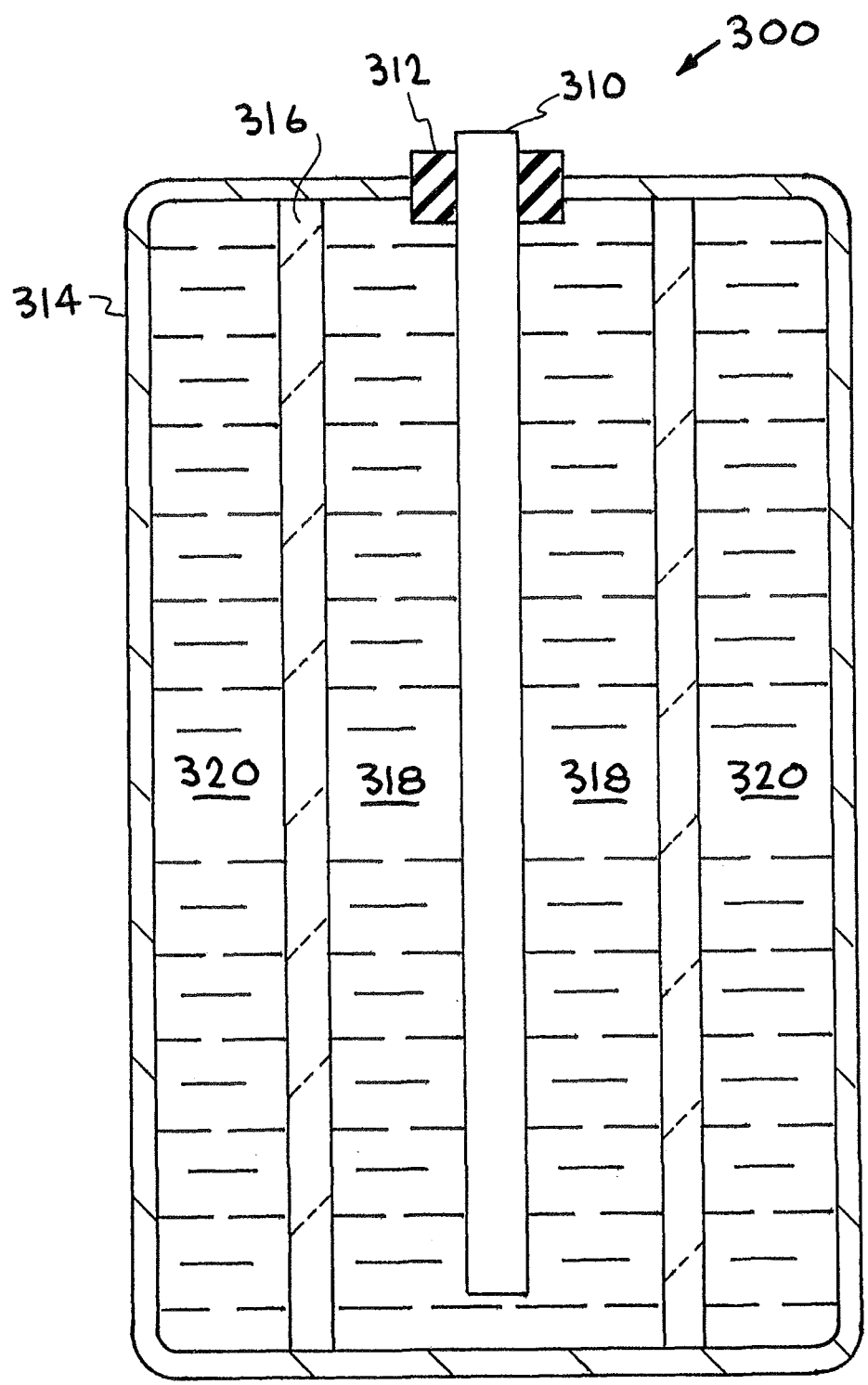
FIG. 3 illustrates another embodiment of a battery of the present invention.

Referring now to FIG. 3, an example of another embodiment of a low temperature sodium-beta battery of the present invention is illustrated. The low temperature sodium-beta battery is designated generally by the reference numeral 300. The battery 300 is a low temperature eutectic alloy anode and cathode battery. The battery 300 is constructed in a cylindrical configuration. The battery 300 includes the following components: current collector 310, electrical insulation 312, casing 314, separator/electrolyte 316, cathode 318, and anode 320. The anode 320 is located in the annulus outside of the separator/electrolyte 316. The cathode 318 is located in the inner annulus around the current collector 310.

The current collector 310 can be made of stainless steel 304 or 316. The separator/electrolyte 316 is a sodium-conducting separator, for example a β"-Al$_2$O$_3$ sodium-conducting separator. The cathode 318 is a low melting ion liquid cathode. For example, the cathode 318 is a low melting ion liquid cathode and can be made of FeCl$_2$ or NiCl$_2$ or mixture of FeCl$_2$ and NiCl$_2$. The anode 320 is a sodium eutectic anode that is in a liquid state at ambient (or lower) temperature. Additions of other alkali metals to the Na anode 320 will suppress the melting point over a wide range of composition. For example, the melting points for Na, K, Rb and Cs are 97.82° C., 63.70° C., 38.89° C. and 28.39° C., respectively with the melting points decreasing with increasing atomic size.

In the construction of the battery 300 a low-melting Na alloy is used as the anode 320 that cycles between Na-rich and Na-lean alloy compositions. The melting point of the proposed Na-based alloy anode 320 is less than 30° C., below the melting point of pure Na (98° C.). The alloy for anode 320 has been designed so that the other alloying elements are electrochemically stable at potentials where Na is oxidized and reduced. Similarly, other low-melting alloy systems have been developed for fabrication of the cathode 318, and will operate below 30° C. The Applicant has realized and documented that the main challenge for building this type of battery in the past was the lack of material technology available for reducing the melting point of the electrodes, and thus the overall operating temperature. The Applicant has identified the key components and materials needed to develop a low-temperature Na-β battery; and performance data has shown each piece of the overall system works as intended when separate, and that when integrated together produces the desired result. The low melting binary sodium alloy for anode 320 has very high electrical conductivity and can be used with minimal current collector metal, thereby lowering the battery 300 in weight. In addition, by using liquid electrodes, the battery 300 will be able to maintain dimensional stability over thousands of charge-discharge cycles, thereby achieving unparalleled system life and life cycle cost.

The anode 320 and cathode 318 electrodes are capable of remaining in the liquid state at much lower temperature, perhaps as low as −30° C. Such an achievement eliminates the need for thermal insulation and avoids the energy losses associated with heat leakage. Specific energies of 600 to 1200 Wh/kg may be achievable, with relatively good reliability and safety.

Prior art sodium-beta (Na-(3) batteries must be operated at high temperature because it is necessary to keep the liquid anode above the melting point of sodium which is 207.9° F. The subject invention is a sodium-beta battery that utilizes a sodium eutectic liquid anode made of a material that is in a liquid state at ambient temperature or lower.

Figure 4:
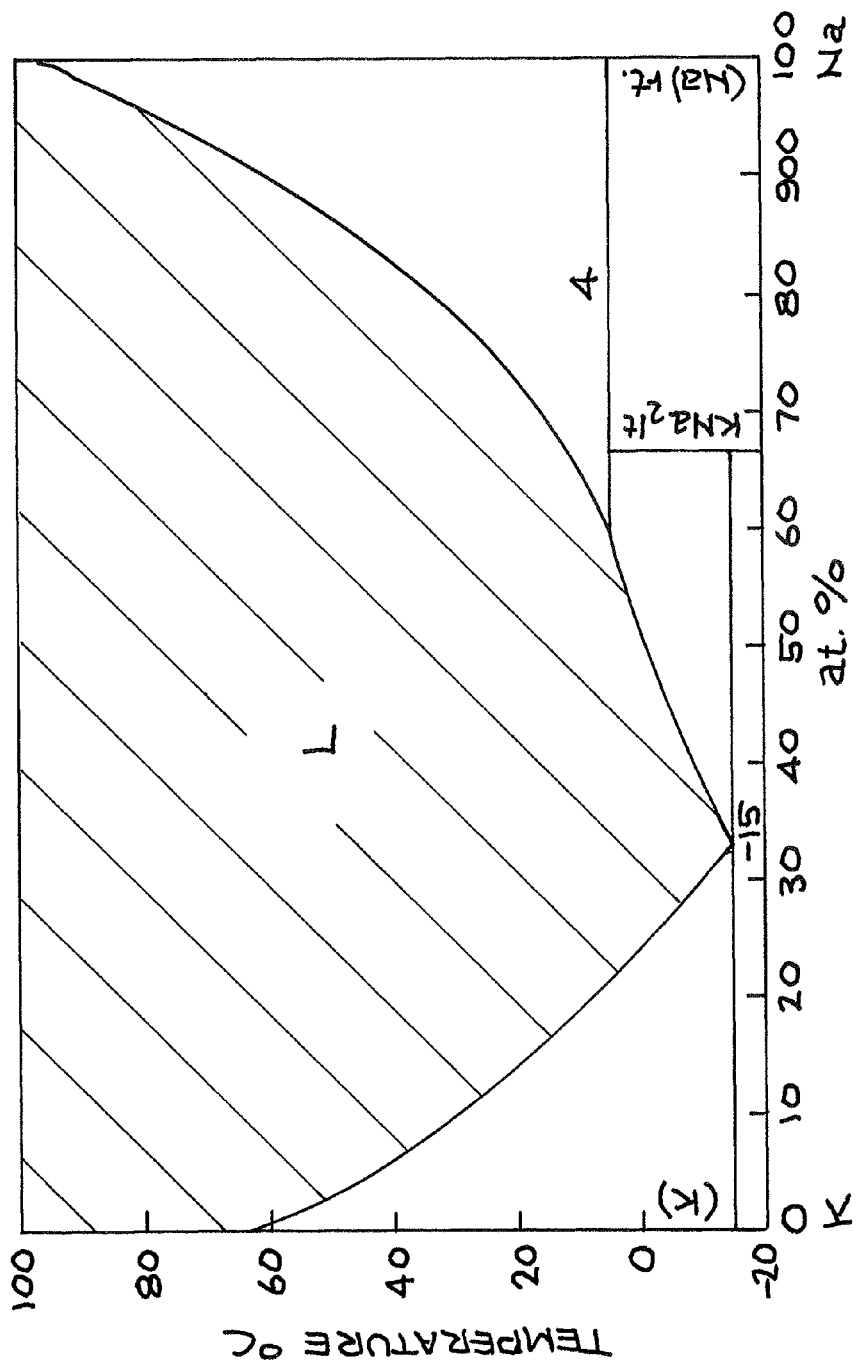
FIG. 4 is a phase diagram for binary Na—K alloy.
Figure 5:
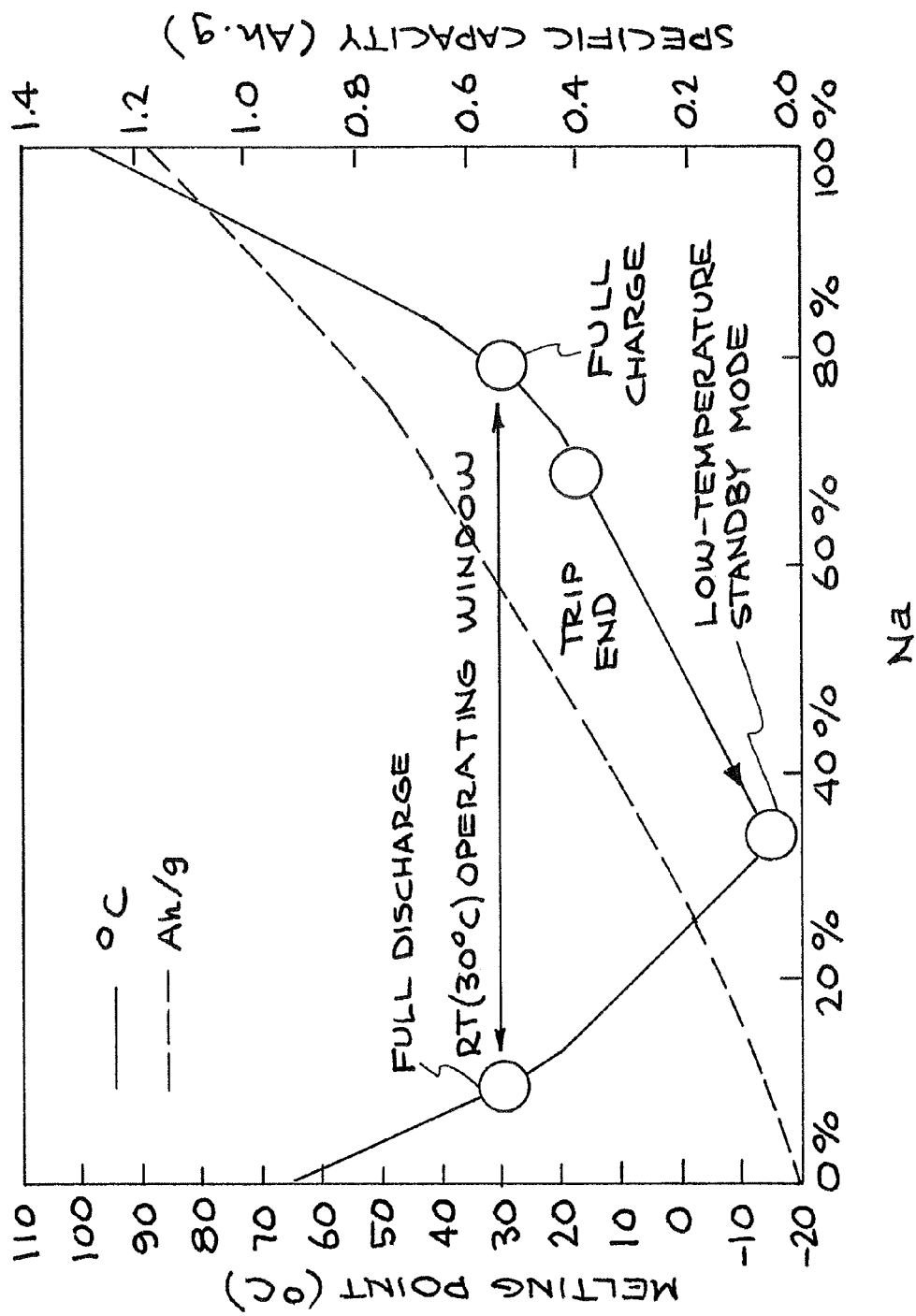
FIG. 5 is a graph illustrating that the capacity of a relatively low-melting Na—K anode will vary with composition.

Referring now to FIG. 4, a phase diagram for binary Na—K alloy shows low-melting eutectic at approximately −15° C. FIG. 5 is a graph illustrating that the capacity of a relatively low-melting Na—K anode will vary with composition. Higher order alloys have even lower operating temperatures, and can be interpreted using the CALPHAD approach and the THERMOCALC code. The higher order alloys provide improved materials for the anode.

Several sodium-beta cells are utilize, with a sodium-conducting (3"-$Al_2O_3$ separator 316, and with electrodes 318 and 320 that exist in the liquid state at ambient (or lower) temperature, without the energy losses and penalties in weight and volume associated with high temperature operation. Additions of other alkali metals to the Na anode will suppress the melting point over a wide range of composition. For example, the melting points for Na, K, Rb and Cs are 97.82° C., 63.70° C., 38.89° C. and 28.39° C., respectively with the melting points decreasing with increasing atomic size. In contrast, the melting point of the 31Na-69K eutectic composition is −12.62° C., while the melting points of the 18Na-82Rb and 20Na-80Cs eutectic compositions are −4° C. and −31.83° C., respectively. The phase diagram for the Na—K binary alloy published by ASM (FIG. 4) indicates that the eutectic (33Na-67K) has a slightly different melting point (−15° C.).

Examination of the Na—K system reveals that this system remains in the molten state at temperatures at or below 30° C. from 15Na-85K to 60Na-40K (differential of 45 atomic percent Na, active material). The effective specific capacity associate with this differential composition is approximately 530 Ah/kg, compared to 1,170 Ah/kg from pure Na. Willingness to operate at 40° C. extends this range from 10Na-90K to 70Na-30K (differential of 60 atomic percent Na, active material). It will be possible to maintain this electrode in the molten state at temperatures as low as −15° C. (melting point of the eutectic) by using the battery management system (BMS) to bring the electrode to the eutectic composition while standby mode, which occurs at a state-of-charge (SOC) of approximately 36 percent.

Figure 6:
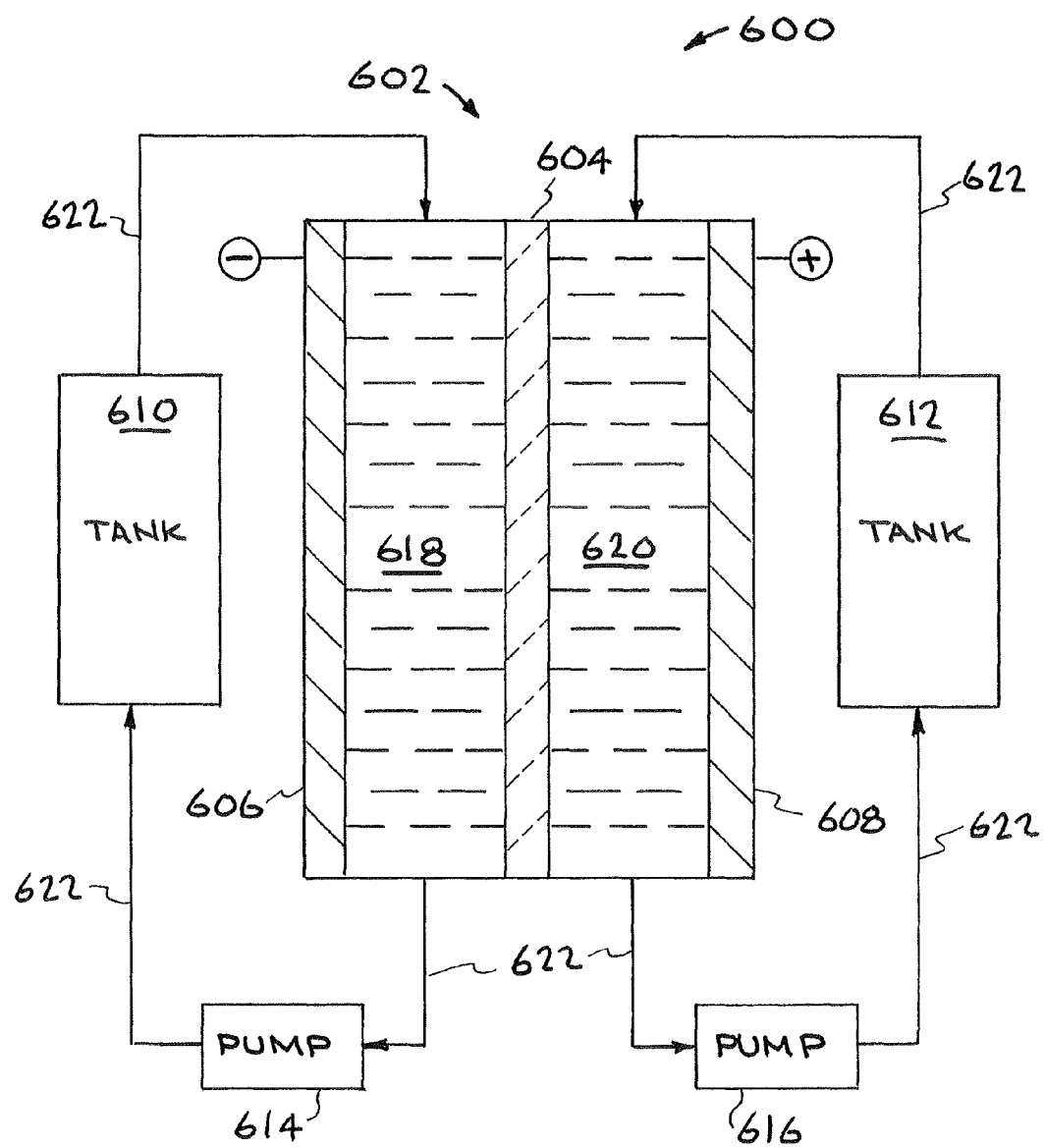
FIG. 6 is a schematic of another embodiment of a low temperature sodium-beta battery of the present invention.

FIG. 6 is a schematic of another embodiment of a low temperature sodium-beta battery of the present invention. The schematic is designated generally by the reference numeral 600. The schematic 600 includes the following components: battery 602, separator 604, anode 606, cathode 608, reservoir tank 610, reservoir tank 612, pump 614, pump 616, liquid Na-k anode material 618, liquid S—Br or other cathode material 620, and lines 622. The battery is generally indicated a 602. The battery 602 has an anode 606 and a cathode 608. There are two chambers to hold the liquid anode material 618 and the liquid cathode material 620. The liquid anode material can be Na-k and the liquid cathode material can be S—Br or other cathode materials. There are two storage tanks 610 and 612 that are external of the battery 602. The tank 610 and 612 contain additional liquid anode and cathode material and this additional material can be circulated thru the battery cell by the pumps 614 and 616 and the lines 622. The addition of the external tanks and the material contain scales up the storage capacity of the battery.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A battery that will operate at ambient temperature, comprising:
   an enclosure,
   a current collector within said enclosure, a liquid sodium eutectic anode within said enclosure located around and in contact with said current collector, said liquid sodium eutectic anode made of a liquid sodium eutectic material that will operate at ambient temperature,
   a liquid cathode within said enclosure, said liquid cathode made of a eutectic material that will operate at ambient temperature,
   a separator and electrolyte within said enclosure between said liquid anode and said liquid cathode wherein said separator and electrolyte is located around and in contact with said liquid anode, and wherein said liquid cathode is located around and in contact with said separator and electrolyte,
   a liquid anode reservoir operably connected to said liquid anode, and
   a liquid cathode reservoir operably connected to said liquid cathode.

2. The battery that will operate at ambient temperature of claim 1 wherein said current collector is a stainless steel current collector.

3. The battery that will operate at ambient temperature of claim 1 wherein said liquid sodium eutectic anode made of a liquid sodium eutectic material that will operate at ambient temperature is a liquid sodium eutectic anode made entirely of a liquid sodium eutectic material that will operate at ambient temperature.

4. The battery that will operate at ambient temperature of claim 1 wherein said liquid sodium eutectic anode made of a liquid sodium eutectic material that will operate at ambient temperature is a sodium eutectic anode, wherein said sodium eutectic anode is made of entirely of a liquid sodium eutectic material that is in a liquid state at ambient temperature.

5. The battery that will operate at ambient temperature of claim 1 wherein said liquid cathode is a low melting ion liquid cathode made entirely of a eutectic material that will operate at ambient temperature.

6. The battery that will operate at ambient temperature of claim 1 wherein said liquid cathode made of a material that will operate at ambient temperature is a low melting ion liquid cathode wherein said low melting ion liquid cathode is made entirely of a eutectic material that is in a liquid state at ambient temperature.

7. The battery that will operate at ambient temperature of claim 1 wherein said separator and electrolyte within said enclosure between said anode and said cathode is a sodium conducting separator.

8. The battery that will operate at ambient temperature of claim 1 wherein said separator and electrolyte within said enclosure between said anode and said cathode is a β"-$Al_2O$ sodium conducting separator.

9. A battery apparatus that will operate at ambient temperature, comprising:
   an enclosure;

a current collector within said enclosure;
a liquid anode within said enclosure, said liquid anode made of a liquid sodium eutectic material that will operate at ambient temperature,
a liquid cathode within said enclosure, said liquid cathode made of a material that will operate at ambient temperature,
a separator and electrolyte within said enclosure between said liquid anode and said liquid cathode,
a liquid anode reservoir operably connected to said enclosure and said liquid anode,
a liquid anode circulation system for circulating said liquid anode between said enclosure and said liquid anode reservoir,
a liquid cathode reservoir operably connected to said enclosure and said liquid cathode, and
a liquid cathode circulation system for circulating said liquid anode between said enclosure and said liquid cathode reservoir.

10. The battery apparatus that will operate at ambient temperature of claim 9 wherein said current collector is a stainless steel current collector.

11. The battery apparatus that will operate at ambient temperature of claim 9 wherein said liquid anode made of a liquid sodium eutectic material that will operate at ambient temperature is made entirely of a liquid sodium eutectic material that will operate at ambient temperature.

12. The battery apparatus that will operate at ambient temperature of claim 9 wherein said liquid cathode made of a material that will operate at ambient temperature is a low melting ion liquid cathode that will operate at ambient temperature.

13. The battery apparatus that will operate at ambient temperature of claim 9 wherein said liquid cathode made of a material that will operate at ambient temperature is a low melting ion liquid cathode made of a material that is in a liquid state at ambient temperature.

14. The battery apparatus that will operate at ambient temperature of claim 9 wherein said separator and electrolyte within said enclosure between said anode and said cathode is a sodium conducting separator.

15. The battery apparatus that will operate at ambient temperature of claim 9 wherein said separator and electrolyte within said enclosure between said liquid sodium anode and said cathode is a $\beta''$-$Al_2O$ sodium conducting separator.

16. A method of making a battery that will operate at ambient temperature, comprising the steps of:
providing an enclosure,
providing a current collector within said enclosure,
locating a liquid anode made of a liquid sodium eutectic material that is a liquid at ambient temperature within said enclosure,
locating a liquid cathode made of a material that is a liquid at ambient temperature within said enclosure,
positioning a separator and electrolyte within said enclosure between said anode and said cathode,
positioning a liquid anode reservoir operably connected to said enclosure and said liquid anode,
locating a liquid anode circulation system for circulating said liquid anode between said enclosure and said liquid anode reservoir,
positioning a liquid cathode reservoir operably connected to said enclosure and said liquid cathode, and
locating a liquid cathode circulation system for circulating said liquid anode between said enclosure and said liquid cathode reservoir.

17. The method of making a battery that will operate at ambient temperature of claim 16 wherein said current collector is a stainless steel current collector.

18. The method of making a battery that will operate at ambient temperature of claim 16 wherein said liquid anode made of a liquid sodium eutectic material is made entirely of a liquid sodium eutectic anode that will operate at ambient temperature.

19. The method of making a battery that will operate at ambient temperature of claim 16 wherein said liquid anode made of a liquid sodium eutectic material is made entirely of a liquid sodium eutectic material that is in a liquid state at ambient temperature.

20. The method of making a battery that will operate at ambient temperature of claim 16 wherein said liquid cathode made of a material that is a liquid at ambient temperature is a low melting ion liquid cathode that will operate at ambient temperature.

21. The method of making a battery that will operate at ambient temperature of claim 16 wherein said liquid cathode made of a material that is a liquid at ambient temperature is a low melting ion liquid cathode made of a material that is in a liquid state at ambient temperature.

22. The method of making a battery that will operate at ambient temperature of claim 16 wherein said separator and electrolyte within said enclosure between said anode made of a material that is a liquid at ambient temperature and said cathode made of a material that is a liquid at ambient temperature is a sodium conducting separator.

23. The method of making a battery that will operate at ambient temperature of claim 16 wherein said separator and electrolyte within said enclosure between said anode made of a material that is a liquid at ambient temperature and said cathode made of a material that is a liquid at ambient temperature is a $\beta''$-$Al_2O$ sodium conducting separator.

24. A battery that will operate at ambient temperature, comprising:
an enclosure,
a current collector within said enclosure,
an anode chamber,
a liquid Na—K anode made entirely of liquid Na—K material that will operate at ambient temperature within said anode chamber,
a cathode chamber,
a liquid S—Br cathode made entirely of liquid S—Br material that will operate at ambient temperature within said cathode chamber,
a separator and electrolyte within said enclosure between said anode chamber and said cathode chamber,
an anode material storage tank containing said liquid Na—K anode material that will operate at ambient temperature,
an anode material circulation system for circulating said liquid Na—K anode material that will operate at ambient temperature from said anode material storage tank to said anode chamber,
a cathode material storage tank containing said liquid S—Br material that will operate at ambient temperature, and
a cathode material circulation system for circulating said liquid S—Br material that will operate at ambient temperature.

* * * * *